United States Patent
Godwin, Jr.

(10) Patent No.: US 11,377,805 B2
(45) Date of Patent: Jul. 5, 2022

(54) SYSTEM AND METHOD FOR CONTROL OF OPERATIONAL ASPECTS OF A SNOW PLOW BLADE AND/OR SPREADER

(71) Applicant: James Patrick Godwin, Jr., Dunn, NC (US)

(72) Inventor: James Patrick Godwin, Jr., Dunn, NC (US)

(*) Notice: Subject to any disclaimer, the term of this patent is extended or adjusted under 35 U.S.C. 154(b) by 463 days.

(21) Appl. No.: 16/696,211

(22) Filed: Nov. 26, 2019

(65) Prior Publication Data

US 2021/0156098 A1    May 27, 2021

(51) Int. Cl.
*E01H 5/06* (2006.01)
*E01H 10/00* (2006.01)
*B60K 35/00* (2006.01)

(52) U.S. Cl.
CPC ............ *E01H 5/061* (2013.01); *B60K 35/00* (2013.01); *E01H 10/00* (2013.01); *B60K 2370/782* (2019.05)

(58) Field of Classification Search
CPC ......... E01H 5/061; E01H 10/00; B60K 35/00; B60K 2370/782
See application file for complete search history.

(56) References Cited

U.S. PATENT DOCUMENTS

| | | | | |
|---|---|---|---|---|
| 2005/0039968 A1* | 2/2005 | Lashua | .................. | H01H 13/86 |
| | | | | 180/332 |
| 2005/0234622 A1* | 10/2005 | Pillar | ........................ | B60L 3/12 |
| | | | | 701/41 |
| 2006/0231309 A1* | 10/2006 | Lashua | .................. | A01B 63/00 |
| | | | | 180/89.12 |
| 2008/0024463 A1* | 1/2008 | Pryor | .................... | B60K 37/06 |
| | | | | 345/175 |

(Continued)

FOREIGN PATENT DOCUMENTS

CA    3072705 A1    8/2020

OTHER PUBLICATIONS

Jones, K., "Allied's Forward Controls put plow functions at driver's fingertips", APWA Snow Conference, May 28, 2019, pp. 1., Salt Lake City, Utah.

*Primary Examiner* — Ibrahim A Khan
(74) *Attorney, Agent, or Firm* — Coats & Bennett, PLLC

(57) ABSTRACT

User-actuated switches that are integrated into the vehicle's interior, such as on the steering wheel, are re-purposed to control operational aspects of a snow plow and/or sand/salt spreader connected to the vehicle. A mode switch is interposed between the user-actuated switches and the vehicle chassis wiring, and also connects to a control system that controls a spreader, and/or a hydraulic subsystem that controls operational aspects of the snow plow. In a normal mode, the mode switch restores the factory connection between the user-actuated switches and the vehicle chassis (Continued)

wiring. In this mode, the user-actuated switches control the vehicle or peripheral functions, such as cruise control, the audio subsystem, or the like. In a snow mode, the mode switch connects the user-actuated switches to the control system. In this mode, the user-actuated switches control operational aspects of the snow plow, such as blade height, blade attack angle, blade yaw angle, and the like, and/or control operational aspects of the spreader, such as on/off, discharge volume, dispersion width, and the like.

21 Claims, 4 Drawing Sheets

(56) References Cited

U.S. PATENT DOCUMENTS

| | | | |
|---|---|---|---|
| 2009/0105911 A1* | 4/2009 | Okeson | E02F 9/2041 |
| | | | 254/323 |
| 2010/0188343 A1* | 7/2010 | Bach | B60K 37/06 |
| | | | 345/173 |
| 2015/0070319 A1* | 3/2015 | Pryor | G06F 3/042 |
| | | | 345/175 |
| 2016/0075324 A1* | 3/2016 | Brombach | B60W 30/1886 |
| | | | 701/48 |
| 2017/0023127 A1* | 1/2017 | Greasamar | B60K 17/348 |
| 2017/0062148 A1* | 3/2017 | Legel | H01H 13/83 |
| 2017/0344004 A1* | 11/2017 | Foster | A01B 69/00 |
| 2018/0202539 A1 | 7/2018 | Shibata et al. | |
| 2018/0244155 A1* | 8/2018 | Keenan | F16H 59/02 |

\* cited by examiner

SYSTEM AND METHOD FOR CONTROL OF OPERATIONAL ASPECTS OF A SNOW PLOW BLADE AND/OR SPREADER

FIELD OF INVENTION

The present invention relates generally to vehicles, and in particular to a system and method for controlling operational aspects of a snow plow blade and/or a spreader connected to a vehicle, via user-actuated switches integrated into the vehicle interior.

BACKGROUND

The term snow plow broadly refers to any vehicle, to which a blade or scraper device is affixed for displacing snow and ice from the surface of a roadway, runway, parking lot, or other area, to facilitate use of the surface by other vehicles. Although many configurations are known in the art, a modern snow plow is typically a truck or other large, heavy vehicle, with a blade affixed to the front end. The blade is preferably adjustable in numerous operational aspects. These include the height of the blade over the road surface, the blade attack angle (the angle of inclination to the road surface, measured from horizontal); and the blade yaw angle (the deviation of the blade from a plane perpendicular to the vehicle's direction, which controls whether snow is displaced to the left or right). Many snow plows additionally carry a load of sand, salt, brine, or other aggregate or chemical melting agents to assist the removal of ice and snow from a road surface, and prevent water on the surface from (re)freezing. A spreader or sprayer (collectively referred to herein as a "spreader") distributes the aggregate or chemical across the road surface as the snow plow moves over it. The spreader is preferably adjustable in numerous operational aspects. These include starting/stopping discharge from the spreader (e.g., a "pause" operation); controlling the width of dispersion (e.g., the number of road lanes covered); and controlling the volume of spreader output, both in continuous operation, and also possibly in a momentary "blast" of increased volume, as may be necessary on bridges, intersections, freeway ramps, and the like.

On small and/or inexpensive snow plow models, these blade and/or spreader adjustments may be manual. However, for convenience and to provide the greatest flexibility in adjusting to changing road and weather conditions, the blade and/or spreader adjustments are preferably made dynamically from within the vehicle's interior. For example, where operational aspects of the snow plow are controlled hydraulically, it is known to locate a set of hydraulic controls (buttons, levers, and the like) on the floorboard or a console, next to the driver's seat. As another example of interior controls, for snow plows built from dump trucks, controls for the lifting and lowering the dump hoist, to dump material from the bed, are often provided in the interior of the vehicle.

Almost by definition, snow plows operate on hazardous road conditions, and often in dangerous weather, such as a snow, freeing rain, or a blizzard. In such conditions, safety demands that the driver's concentration be focused on the task of operating the vehicle; even a momentary diversion of attention could present a safety hazard. Accordingly, the ability to control operational aspects of the snow plow, spreader, dump hoist, and the like, from within the vehicle, and without the need for the driver to take his or her eyes off of the road, would constitute a significant advance in safety and efficiency.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, user-actuated switches that are integrated into the vehicle's interior, such as on the steering wheel, are re-purposed to control operational aspects of a snow plow blade and/or spreader connected to the vehicle. A mode switch is interposed between the user-actuated switches and the vehicle chassis wiring, and also connects to a control system that controls operational aspects of the spreader, or operational aspects of the snow plow via a hydraulic system. In one switch setting, called a normal mode, the mode switch restores the factory connection between the user-actuated switches and the vehicle chassis wiring. In this mode, the user-actuated switches control the vehicle or peripheral functions, such as cruise control, the audio subsystem, or the like. In another switch setting, called a snow mode, the mode switch connects the user-actuated switches to the control system. In this mode, the user-actuated switches control operational aspects of the snow plow, such as blade height, blade attack angle, blade yaw angle, and the like, or operational aspects of the spreader, such as on/off, discharge volume, dispersion width, and the like. In this manner, the vehicle driver can dynamically adjust operational aspects of the snow plow blade and/or spreader without diverting his or her concentration from the task of operating the vehicle. In one embodiment, the control system includes a touchscreen interface, such as a table computer, and the driver (or other vehicle occupant) may controls operational aspects of the snow plow blade and/or spreader via the touchscreen interface, as well as via the user-actuated switches. The mode switch may be a manual, n-pole, 2-throw switch (where n is the number of wires connected to the user-actuated switches), or it may be implemented by a communication gateway connected to the vehicle chassis wiring by a protocol diagnostics connector. Manual hydraulic controls may also be mounted in the vehicle interior, providing up to three ways to control operational aspects of the snow plow blade.

One embodiment relates to a vehicle, having one or more user-actuated controls integrated into a steering wheel of the vehicle and designed to control vehicle or peripheral functions. The vehicle includes at least one snow plow blade configured to displace snow and ice from a surface on which the vehicle operates; a hydraulic subsystem configured to control operational aspects of the snow plow blade; and a control system configured to control at least one of the hydraulic subsystem and a spreader in response to user input. The vehicle also includes a mode switch connected to the user-actuated controls, the control system, and vehicle chassis wiring. The mode switch is configured to switch between a normal mode and a snow mode. In normal mode, the user-actuated controls are connected to the vehicle chassis wiring and are configured to control vehicle or peripheral functions. In snow mode, the user-actuated controls are connected to the control system, and are configured to control operational aspects of at least one of the snow plow blade and a spreader.

Another embodiment relates to a method of controlling operational aspects of a snow plow blade connected to a vehicle. A mode switch in the vehicle is set to a normal mode, whereby the user-actuated controls are connected to the vehicle chassis wiring. Vehicle or peripheral functions are controlled by actuating one or more of the user-actuated controls in the normal mode. The mode switch in the vehicle is set to a snow mode, whereby one or more user-actuated controls integrated into a steering wheel of the vehicle are connected to a control system configured to control operational aspects of at least one of the snow plow blade and the spreader. One or more operational aspects of the snow plow blade or spreader are controlled by actuating one or more of the user-actuated controls in the snow mode.

Yet another embodiment relates to a vehicle having one or more user-actuated controls integrated into an interior of the vehicle and designed to control vehicle or peripheral functions. The vehicle includes equipment configured to mitigate hazardous driving conditions due to accumulation of snow or ice on a surface on which the vehicle operates; one or more subsystems configured to control operational aspects of the driving hazard mitigation equipment; and a control system configured to control the subsystems in response to user input. The vehicle also includes a mode switch connected to the user-actuated controls, the control system, and vehicle chassis wiring. The mode switch is configured to switch between a normal mode and a snow mode. In normal mode, the user-actuated controls are connected to the vehicle chassis wiring and are configured to control vehicle or peripheral functions. In snow mode, the user-actuated controls are connected to the control system, and are configured to control operational aspects of the driving hazard mitigation equipment.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

A modern snow plow typically comprises a large, heavy vehicle, such as a truck, with an adjustable blade affixed to the front end for the displacement of snow and ice from a road or other surface. Smaller snow plows, such as those used by contractors to clear private roads, parking lots, small airports, and the like, may be built from pickup trucks (e.g., class 1-4), preferably those having four-wheel drive (4WD). Larger snow plows, such as those used by state, county, or municipal governments for clearing public roads and highways, are often built from medium or heavy trucks (e.g., class 5, 6, or 7). In particular, snow plows with spreaders attached may be built from dump trucks, which have a very large capacity to carry sand, salt, and the like.

Figure 1:
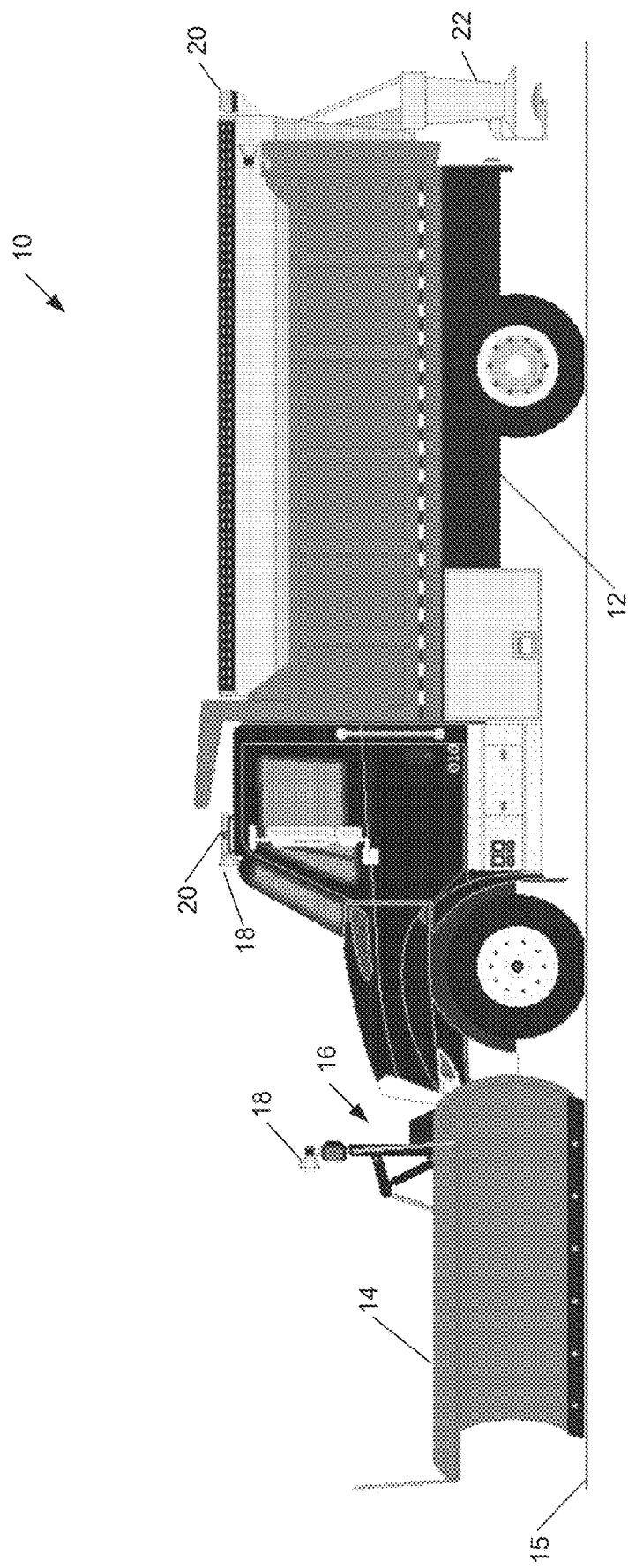
FIG. 1 is a side view of a snow plow built from a dump truck.

FIG. 1 depicts a snow plow 10. The snow plow 10 comprises a conventional dump truck 12, which has been upfitted to operate as a snow plow 10. A snow plow blade 14 is affixed to the front of the truck 12 via an actuating mechanical linkage 16. The actuating mechanical linkage 16 includes static structural members, such as brackets, and also one or more actuators, such hydraulic pistons, which control operational aspects of the snow plow blade 14 (e.g., blade height, blade attack angle, blade yaw angle). The snow plow blade 14 displaces snow and ice from the road surface as the snow plow 10 drives over it. Auxiliary task lights 18 illuminate the roadway being cleared, and flashing hazard lights 20 enhance conspicuity to other traffic, for safety. A spreader 22 is affixed to the rear of the truck 12. The spreader 22 discharges sand (or other aggregate) from the dump bed onto the surface 15 to enhance traction, or salt (or other melting agent) to lower the freezing point of water on the road, or a mixture of the two. The spreader 22 may be controlled to alter its operational characteristics, such as turning it off and on, controlling the volume of material output, altering the width of dispersion of material, and the like.

Virtually all modern trucks 12 are equipped at the factory with a variety of subsystems, each directed to different functionality. For example, a vehicle interior climate control typically includes a heater and air conditioner, and may include heated seats and steering wheel. An audio subsystem may include an AM/FM and/or satellite radio, CD or other media player, and the like, and may include features such as wireless connectivity to mobile phones, voice recognition, and other functions. Various safety systems include airbags, seat belt sensors, auto locking doors, and the like. Many trucks 12 include navigation and tracking systems. Other subsystems relate to various aspects of vehicle control, such as cruise control, lane tracking, parking sensors or assistance, blind spot cameras or sensors, and the like. Controls for these systems may include a wide variety of buttons, switches, dials, sliders, joystick type actuators, and the like. Increasingly, control of numerous of these subsystems is integrated in a central display, which may include a touchscreen interface.

For enhanced safety by minimizing diversions of the driver's attention from the road, many vehicle subsystem controls are integrated into the steering wheel, and/or stems attached to the steering column. After familiarization, these controls allow the driver to control numerous aspects of the vehicle 12 or its subsystems "by feel," without diverting attention from the task of driving. In particular, cruise control, and audio/communication subsystem controls are typically integrated into user-actuated controls that are factory-mounted on the steering wheel. These user-actuated controls may for example comprise rocker switches, push-button switches, thumb wheels, and the like. The user-actuated controls connect through a clockspring to the vehicle chassis wiring.

Figure 2:
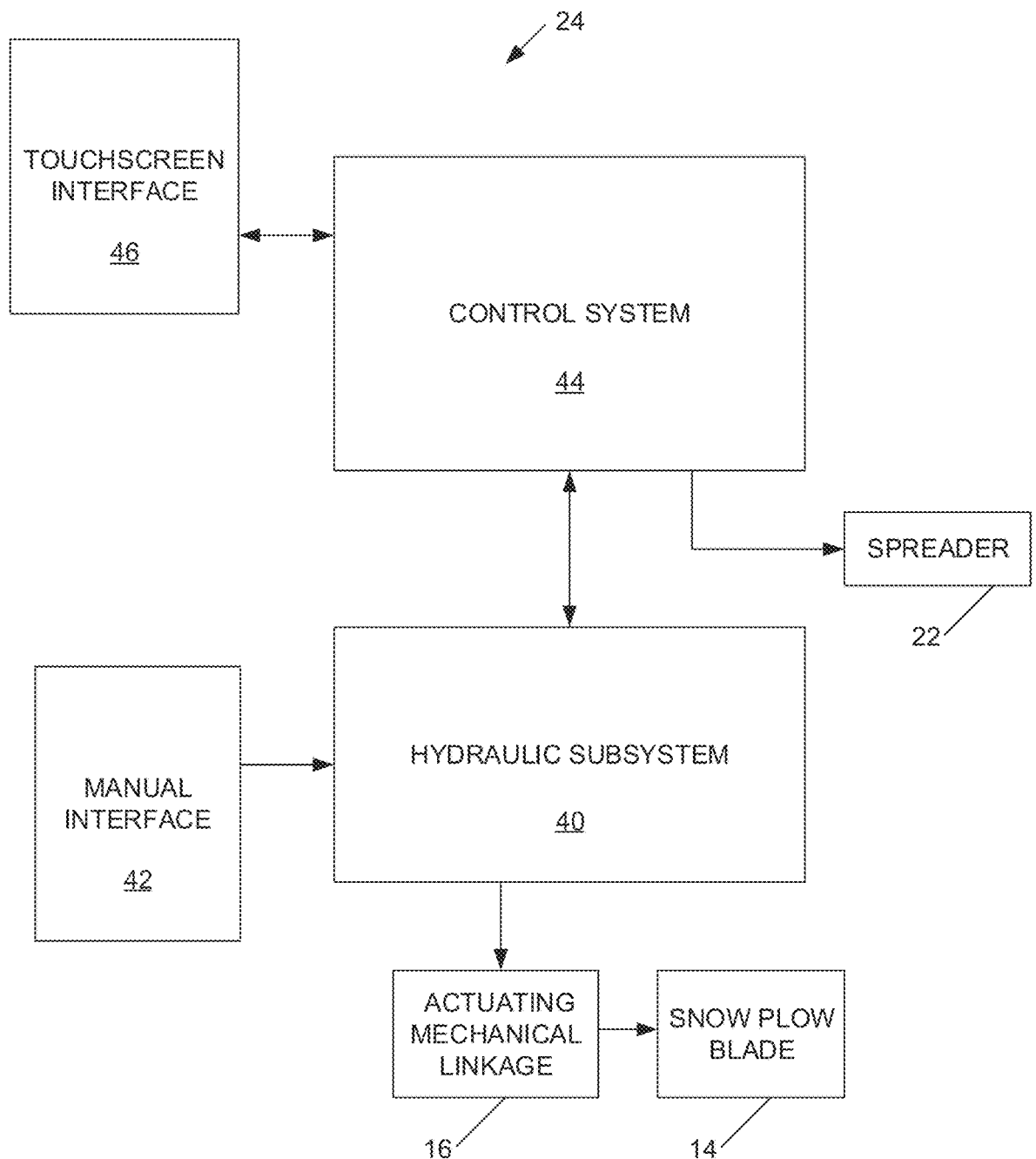
FIG. 2 is a partial block diagram of controls for equipment on a snow plow.

Snow plows 10 are typically created by customizing a new truck 12—adding the snow plow blade 14, the sand/salt spreader 22, auxiliary task lighting 18, flashing rooftop or rear-facing hazard lights 20, and the like. Part of the customization process is providing one or more user interfaces, to allow control of these added systems from within the vehicle interior. FIG. 2 depicts a block diagram 24 of remote controls that may be installed as part of converting a truck 12 to a snow plow 10. As an example, operational aspects of the snow plow blade 14 (e.g., blade height, blade attack angle, blade yaw angle) may be remotely controlled, through the actuating mechanical linkage 16, by, e.g., a hydraulic subsystem 40. A hydraulic subsystem 40 may include a hydraulic fluid reservoir, a hydraulic pump, and a plurality of solenoids, valves, pistons, actuators, and other hydraulic components. A manual interface 42 may also be added, to directly control the hydraulic subsystem 40 in response to user input. A typical hydraulic manual interface 42 includes various levers, switches, buttons, and the like, located on the floorboard or a console by the driver's seat.

The hydraulic subsystem 40 may also be controlled electronically by a control system 44, as well as via the manual interface 42. A processor converts user input to electrical control signals. The electrical control signals operate a plurality of hydraulic solenoids, which control the amount and direction of hydraulic fluid flow. Hence, the solenoids (or other components) act as electrical-to-hydraulic transducers. The hydraulic subsystem 40 then actuates pistons and the like in the actuating mechanical linkage 16 to change the operational aspects of the blade 14 in response to the electrical control signals generated by the processor. The processor may, for example, comprise an appropriately programmed tablet computer having a touchscreen interface 46. The snow plow driver may hence control operational aspects of the blade 14, in real-time or "on the fly," by interaction with the touchscreen interface 46. This represents an improvement in operational safety over the use of a manual hydraulic interface 42 on the floorboard, as the touchscreen interface 46 may be mounted to be convenient to the driver, and tapping icons on the screen represents less of a distraction from the task of driving than manual operation of levers in the hydraulic interface 42.

As another example, operational aspects of the sand/salt spreader 22 (e.g., on/off, the volume of material discharged, the width of dispersion, and the like) are also advantageously remotely controlled from within the interior of the vehicle 12. The control system 44 may additionally generate electrical controls for the spreader 22, in response to user input at the touchscreen interface 46.

According to embodiments of the present invention, yet a further increase in safety is achieved by incorporating user-actuated controls integrated with the truck's interior—for example, switches and buttons integrated into the steering wheel—into the control of operational aspects of the snow plow blade 14 and/or spreader 22. After a brief familiarization phase, a driver may adjust the operational aspects of the blade 14 or spreader 22 purely by "feel," without removing his or her eyes from the road. As used herein, "integrated" controls means controls that are designed and installed in the factory—the new truck 12 comes with such controls already installed. Vehicle designers and engineers research safety issues such as distracted driving, and are experts in user interface design. Accordingly, integrated, user-actuated controls are designed into the vehicle 12 in convenient locations, and have actuation modes that make their operation intuitive making these controls the safest and most convenient means possible of controlling operational aspects of the snow plow blade 14 and/or spreader 22.

Preferably, rather than dedicate these integrated user-actuated controls exclusively to control the snow plow blade 14 or spreader 22, their original functionality (e.g., cruise control or audio subsystem control) is preserved, and the controls are only utilized to control operational aspects of the snow plow blade 14 and/or spreader 22 when the snow plow 10 is actually used to clear snow and ice. According to embodiments of the present invention, these integrated user-actuated controls operate in two mutually exclusive modes. In a normal mode, the integrated user-actuated controls are connected to the vehicle chassis wiring, and they are configured to control vehicle or peripheral functions, as designed. In a snow mode, outputs from the integrated user-actuated controls are diverted to the control system, and the driver uses the user-actuated controls to control operational aspects of the snow plow blade 14 and/or spreader 22. The modes may be selected by a mode switch, which may be a manual switch (e.g., mounted to the dashboard or integrated into the control system), or may comprise a gateway function implemented by a processor or controller, that "reinterprets" data produced by actuation of the integrated user-actuated controls, and directs the data to the control system.

Figure 3:
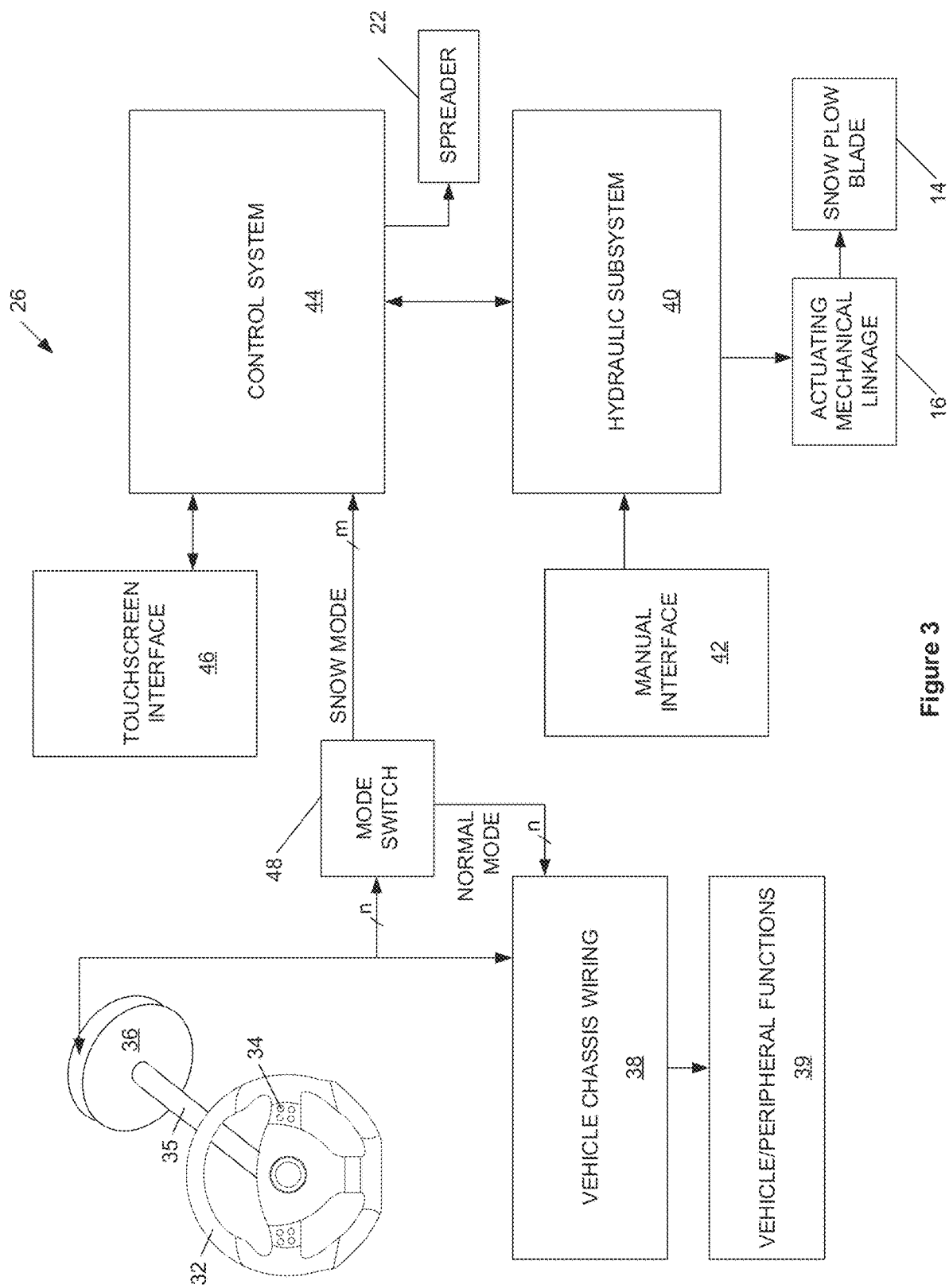
FIG. 3 is a partial block diagram of vehicle-integrated controls utilized to control equipment on a snow plow.

FIG. 3 depicts a block diagram 26 of a controls for a snow plow 10, having one or more user-actuated controls 34 integrated into an interior of the vehicle 12 (such as on a steering wheel 32) and configured to control vehicle or peripheral functions 39. The vehicle 12 has been upfitted to operate as a snow plow 10, by the inclusion of at least one snow plow blade 14 configured to displace snow and ice from a surface 15 on which the snow plow 10 operates, or a spreader 22 configured to discharge aggregate or a melting agent onto the surface 15. A hydraulic subsystem 40 is configured to control operational aspects of the snow plow blade 14, such as blade height, blade yaw angle, and blade attack angle, via hydraulic actuators in the actuating mechanical linkage 16. The hydraulic subsystem 40 may be controlled by a manual interface 42, such as levers, buttons, switches, and the like mounted on the floorboard or on a console by the driver's seat. The hydraulic subsystem 40 may additionally be controlled by a control system 44. The control system 44 includes a touchscreen interface 46, which displays information such as the current blade position, angles, and the like, and which also accepts user input to control operational aspects of the snow plow blade 14. The touchscreen interface 46 may also display information about a sand/salt spreader 22, and accepts user input to control operational aspects of the spreader 22, such as on/off, discharge volume, dispersion width, and the like.

A plurality of user-actuated controls 34 are integrated into an interior of the vehicle 12, in this case on the steering wheel 32. The user-actuated controls 34 may comprise buttons, rocker switches, thumb wheels, or the like. Electrical signals from the integrated user-actuated controls 34 are routed through or alongside the steering column 35 to a clockspring 36. As known in the automotive arts, a clockspring 36 is a connector device that routes electrical signals between steering wheel-mounted devices, such as an airbag, user-actuated controls 34, LED indicators, or the like, and the vehicle chassis wiring 38. The clockspring 36 maintains electrical connectivity as the steering wheel 32 and steering column 35 rotate.

According to embodiments of the present invention, at least some signals associated with user-actuated controls 34 are "tapped off" from connection to the vehicle chassis wiring 38, and diverted to a mode switch 48. The signals may comprise, for example, a number "n" of wires. The mode switch 48 may comprise an n-pole, 2-throw manual switch, which selectively connects n inputs with one of two corresponding sets of n outputs—labeled "normal mode" and "snow mode" for reference. When the mode switch 48 is set to normal mode, the n inputs are routed to the vehicle chassis wiring 38, restoring their factory connectivity. In this mode, the user-actuated controls 34 have their conventional effect of controlling vehicle or peripheral functions 39 (e.g., cruise control or an audio subsystem). When the mode switch 48 is set to snow mode, the n inputs are routed to the control system 44. In this mode, the user-actuated controls 34 are configured to control operational aspects of the snow plow blade 14 (e.g., blade height, blade attack angle, blade yaw angle) and/or to control operational aspects of the spreader 22 (e.g., on/off, discharge volume, dispersion width, and the like). Hence, the driver has two independent means of controlling operational aspects of the spreader 22: the touchscreen interface 46; and vehicle-integrated, user-actuated controls 34. In the case of controlling operational aspects of the snow plow blade 14, the driver has these two, and also another option: the hydraulic system manual interface 42. In practice, the greatest safety and convenience is likely achieved by the driver inputting blade 14 and/or spreader 22 controls via the user-actuated controls 34 integrated into the steering wheel 32, and verifying the resulting changes to the blade 14 and/or spreader 22 by text and/or graphics displayed on the touchscreen interface 46.

In one embodiment, as described above, the mode switch 48 is a manually actuated n-pole, 2-throw electrical switch, which simply establishes electrical connectivity between n inputs and one of two sets of corresponding n outputs. The manually actuated switch may be a mechanical switch installed in the interior of the vehicle, such as on the dashboard. Alternatively, a user-actuated control 34 integrated into the vehicle upon manufacture, such as on the steering wheel, may be repurposed to operate the mode switch. As another possibility, the control system 44 may activate the mode switch in response to a user tapping a designated area of the touchscreen interface 46, in response to a "soft" or "virtual" switch displayed on the touchscreen interface 46.

In another embodiment, the mode switch 48 comprises a communication gateway connected to the vehicle chassis wiring 38 by a protocol diagnostics connector. Most modern vehicles 12 employ an intra-vehicle communication network, such as the Controller Area Network (CAN), or more generally, the SAE J1939 bus. CAN/J1939 is a multi-master serial bus utilizing a message-based protocol, and was designed for multiplex electrical wiring. Communication on CAN/J1939 is between Electronic Control Units (ECU), also known as nodes. An ECU can range from a simple I/O device to a complex embedded computer. One type of ECU is a gateway, which translates communications on the vehicle bus to a protocol readable by an external device, such as via USB or an Ethernet port. For example, one known type of gateway is a "code reader" that connects to an On-Board Diagnostics (OBD) port, which is mandatory on virtually every vehicle 12 sold in the U.S. The OBD port reader may access the status of various subsystems and ECUs on the vehicle 12, such as by reading diagnostic trouble codes. The SAE J1939/13 standard defines the physical and electrical standard for a protocol diagnostic connector, which allows custom or aftermarket embedded systems to participate in a J1939 vehicle network. The SAE J1939/13 physical standard defines a round, 9-pin connector, known as a protocol diagnostic connector.

In one embodiment, the mode switch 48 is implemented as a communication gateway. The gateway may be implemented as a stand-alone microcontroller, or may be integrated into the control system 44 (such as the tablet computer processor). The gateway may connect to the vehicle chassis wiring 38 via a standard connector, such as the SAE J1939/13 protocol diagnostic connector. Under program control, in normal mode, the gateway may be inactive, or may receive vehicle diagnostic or operational information of interest, which may for example be displayed on the touchscreen interface 46. In either case, the user-actuated controls 34 retain their designed functions. In snow mode, the gateway may intercept control information output by the user-actuated controls 34 (or an ECU that receives analog signals from the controls 34 and outputs control data). The gateway may cancel or otherwise remove the control information messages from the vehicle communication bus (thereby rendering it ineffective for its designed function, such as control of vehicle or peripheral functions 39) and may pass the control information to the control system 44. An I/O module or programmed functionality in the control system 44 may interpret the control information, and use it to control operational aspects of the spreader 22; or to control the hydraulic subsystem 40 to implement user control of operational aspects of the snow plow blade 14 via the actuating mechanical linkage 16.

Figure 4:
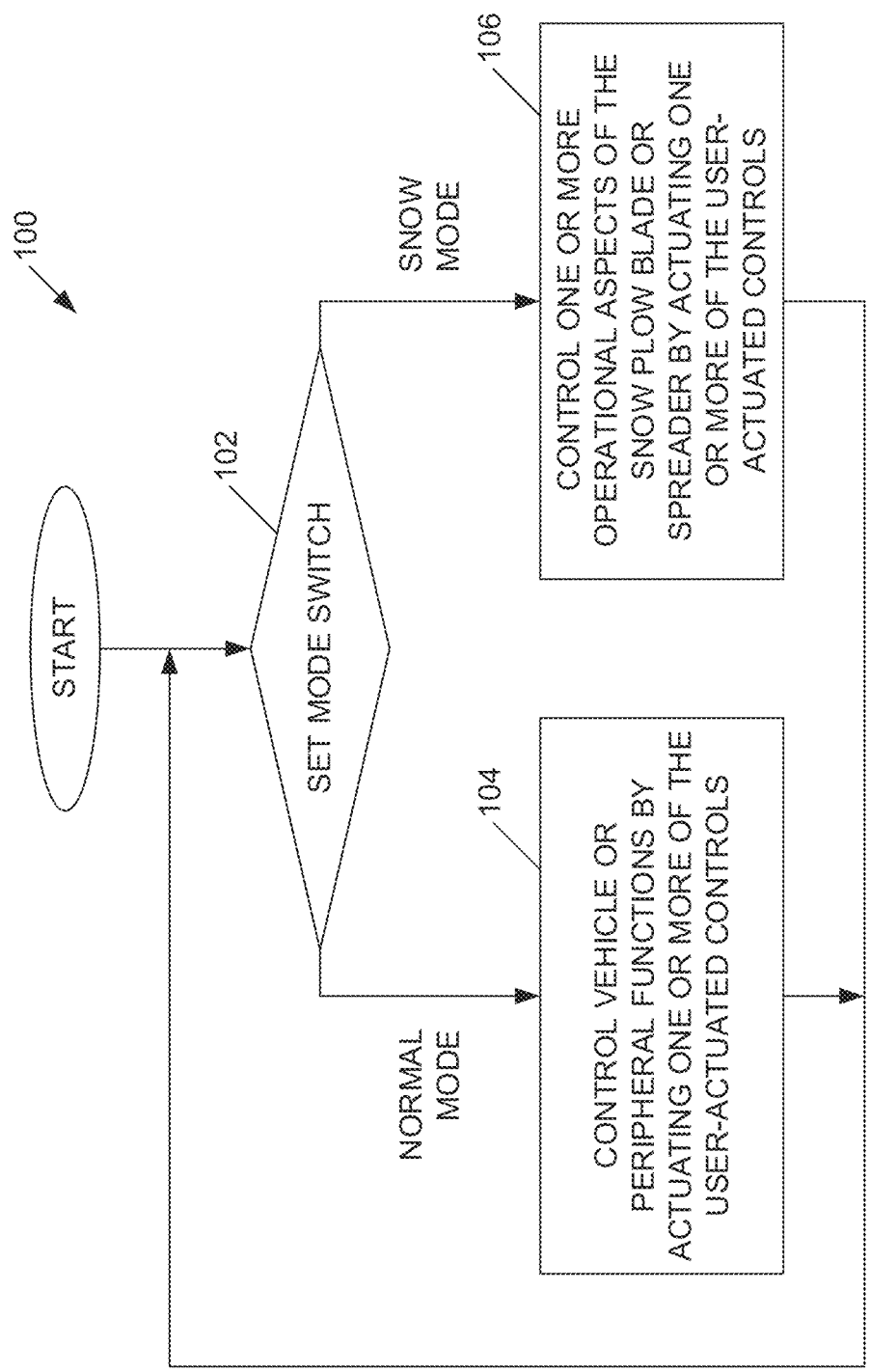
FIG. 4 is a flow diagram of a method of controlling operational aspects of a snow plow blade or a spreader.

FIG. 4 depicts the steps of a method 100 of controlling operational aspects of a snow plow blade 14 and/or spreader 22 connected to a vehicle 12. A mode switch 48 is set to either a normal mode or a snow mode (block 102). In normal mode, the user-actuated controls 34 are connected to the vehicle chassis wiring 38. In normal mode, the driver controls vehicle or peripheral functions 39 by actuating one or more of the user-actuated controls 34 (block 104). When the mode switch 48 is set to snow mode (block 102), one or more user-actuated controls 34 integrated into the steering wheel of the vehicle 12 are connected to a control system 42 configured to control operational aspects of the snow plow blade 14. In snow mode, the driver controls one or more operational aspects of the snow plow blade 14 by actuating one or more of the user-actuated controls 34 (block 106). The functions associated with the user-actuated controls 34 may be changed by actuating the mode switch 48 (block 102).

Embodiments of the present invention present numerous advantages over the prior art. Integrated user-actuated controls 34, such as those integrated on a steering wheel 32, are carefully designed and located to provide the maximum convenience and safety in controlling common vehicle or peripheral functions 39. By repurposing these user-actuated controls 34 to provide user control of operational aspects of one or more snow plow blades 14, sand/salt spreader 22, or other snow plow 10 functions, these advantages of convenience and safety accrue to the inherently hazardous operation of a snow plow 10 on icy roads or other surfaces 15. Furthermore, by making such repurposing of the user-actuated controls 34 optional via a mode switch 48 (and preserving their designed application of controlling vehicle or peripheral functions 39), the originally designed benefits of convenience and safety are not lost when the snow plow 10 is operated while not engaged in road clearing operations (such as travelling to or from assigned road-clearing routes).

Embodiments of the present invention have been described herein by reference to a truck 12 upfitted to operate as a snow plow 10 by the addition of a hydraulically-actuated blade 14, spreader 22, and other equipment. However, the present invention is not limited to such embodiments. For example, snow plow blades 14 may be controlled electrically, pneumatically, or via other known mechanical linkage technologies. Those of skill in the art may readily adapt the teachings of the present disclosure to enhance the safety and convenience of control of operational aspects of all such snow plow blades 14 by utilizing input from vehicle-integrated, user-actuated controls 34.

Additionally, features of embodiments of the present invention have been described herein with reference to a snow plow 10 having a single, front-mounted blade 14. However, the present invention is not limited to such embodiments. Snow plows 10 specifically configured for clearing multi-lane highways or airport runways may have multiple snow/ice displacement blades 14 attached. Such blades 14 may be attached to one or more of the front, rear, or sides of the vehicle 12 (such as over adjacent lanes, or to both sides). Those of skill in the art may readily adapt the teachings of the present disclosure to enhance the safety and convenience of control of operational aspects of all such snow plow blades 14 by utilizing input from vehicle-integrated, user-actuated controls 34. Although the spreader 22 has been described herein as a sand/salt spreader 22, those of skill in the art appreciate that other material may be spread by a snow plow 10 to condition a road surface for safe travel. For example, the spreader 22 may spread aggregate such as sand or salt, or may spray chemicals, such as brine or other melting agent. Those of skill in the art may readily adapt the teachings of the present disclosure to enhance the safety and convenience of control of operational aspects of all such spreaders 22 by utilizing input from vehicle-integrated, user-actuated controls 34.

Furthermore, although described herein with respect to operational aspects of snow plow blades 14 and/or spreaders 22, the present invention is not so limited. Those of skill in the art will readily recognize that user-actuated controls 34 integrated into the vehicle 12 (such as into the steering wheel 32) may also be configured to control operational aspects of a dump truck dump hoist, hazard lighting 20, auxiliary task lighting 18, or other modifications integral to the upfitting of a vehicle 12 chassis to operate as a snow plow 10.

As used herein, the term "configured to" means set up, organized, adapted, or arranged to operate in a particular way; the term is synonymous with "designed to."

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A vehicle, having one or more user-actuated controls integrated into a steering wheel of the vehicle and designed to control vehicle or peripheral functions, the vehicle comprising:
   at least one snow plow blade configured to displace snow and ice from a surface on which the vehicle operates;
   a hydraulic subsystem configured to control operational aspects of the snow plow blade;
   a control system configured to control at least one of the hydraulic subsystem and a spreader in response to user input; and
   a mode switch connected to the user-actuated controls, the control system, and vehicle chassis wiring;
   wherein the mode switch is configured to switch between
      a normal mode, wherein the user-actuated controls are connected to the vehicle chassis wiring and are configured to control vehicle or peripheral functions, and
      a snow mode, wherein the user-actuated controls are connected to the control system, and are configured to control operational aspects of at least one of the snow plow blade and a spreader.

2. The vehicle of claim 1, wherein the mode switch is an n-pole, 2-throw manual switch, where n is the number of wires connected to the user-actuated controls.

3. The vehicle of claim 1, wherein the mode switch is implemented by a communication gateway connected to the vehicle chassis wiring by a protocol diagnostics connector.

4. The vehicle of claim 1, wherein a steering wheel clockspring is interposed between the user-actuated controls and the mode switch.

5. The vehicle of claim 1, wherein the control system further comprises a touchscreen interface, and wherein at least one operational aspect of the snow plow blade can be controlled either by a user-actuated switch in snow mode, or by the touchscreen interface.

6. The vehicle of claim 1, wherein the operational aspects of the snow plow blade controlled by the user-actuated controls in snow mode include one or more of blade height, blade yaw angle, and blade attack angle.

7. The vehicle of claim 1, wherein the hydraulic subsystem comprises:
   a hydraulic pump;
   a hydraulic reservoir; and
   at least one hydraulic solenoid configured to alter the flow of hydraulic fluid in response to an electrical signal from the control system.

8. The vehicle of claim 7, wherein the hydraulic subsystem further comprises manual hydraulic controls, and wherein at least one operational aspect of the snow plow blade can be controlled either by the control system, or by the manual hydraulic controls.

9. The vehicle of claim 1 wherein the operational aspects of the spreader controlled by the user-actuated controls in snow mode include one or more of turning the spreader operation on or off, controlling the volume of material discharged, and controlling the width of dispersion of material discharged.

10. A method of controlling operational aspects of a snow plow blade or a spreader connected to a vehicle, comprising:
   setting a mode switch in the vehicle to a normal mode, whereby the user-actuated controls are connected to the vehicle chassis wiring;
   controlling vehicle or peripheral functions by actuating one or more of the user-actuated controls in the normal mode;
   setting the mode switch to a snow mode, whereby one or more user-actuated controls integrated into a steering wheel of the vehicle are connected to a control system configured to control operational aspects of at least one of the snow plow blade and the spreader; and controlling one or more operational aspects of the snow plow blade or spreader by actuating one or more of the user-actuated controls in the snow mode.

11. The method of claim 10, wherein controlling vehicle or peripheral functions comprises controlling one or more of cruise control or audio subsystem functions, respectively.

12. The method of claim 10, wherein controlling one or more operational aspects of the snow plow blade comprises controlling one or more of blade height, blade yaw angle, and blade attack angle.

13. The method of claim 10, wherein controlling one or more operational aspects of the snow plow blade further comprises interacting with a touchscreen interface of the control system.

14. The method of claim 10, wherein
operational aspects of the snow plow blade are controlled hydraulically; and
the control system is configured to control operational aspects of the snow plow blade by controlling a hydraulic subsystem.

15. The method of claim 14, further comprising:
controlling one or more operational aspects of the snow plow blade by actuating manual hydraulic controls mounted in the vehicle interior, wherein the manual hydraulic controls directly control the hydraulic subsystem.

16. The method of claim 10 wherein the operational aspects of the spreader controlled by the user-actuated controls in snow mode include one or more of turning the spreader operation on or off, controlling the volume of material discharged, and controlling the width of dispersion of material discharged.

17. A vehicle, having one or more user-actuated controls integrated into an interior of the vehicle and designed to control vehicle or peripheral functions, the vehicle comprising:
equipment configured to mitigate hazardous driving conditions due to accumulation of snow or ice on a surface on which the vehicle operates;
one or more subsystems configured to control operational aspects of the driving hazard mitigation equipment;
a control system configured to control the subsystems in response to user input; and
a mode switch connected to the user-actuated controls, the control system, and vehicle chassis wiring;
wherein the mode switch is configured to switch between
a normal mode, wherein the user-actuated controls are connected to the vehicle chassis wiring and are configured to control vehicle or peripheral functions, and
a snow mode, wherein the user-actuated controls are connected to the control system, and are configured to control operational aspects of the driving hazard mitigation equipment.

18. The vehicle of claim 17 wherein the driving hazard mitigation equipment comprises a snow plow blade.

19. The vehicle of claim 18 wherein the subsystem configured to control operational aspects of the driving hazard mitigation equipment comprises a hydraulic subsystem configured to control operational aspects of the snow plow blade.

20. The vehicle of claim 17 wherein the driving hazard mitigation equipment comprises a spreader operative to spread aggregate or a melting agent, carried by the vehicle, onto the surface.

21. The vehicle of claim 20 wherein the vehicle is a modified dump truck, and wherein the driving hazard mitigation equipment further comprises a dump hoist configured to raise or lower a dump bed containing material to be spread by the spreader.

* * * * *